Patented July 19, 1949

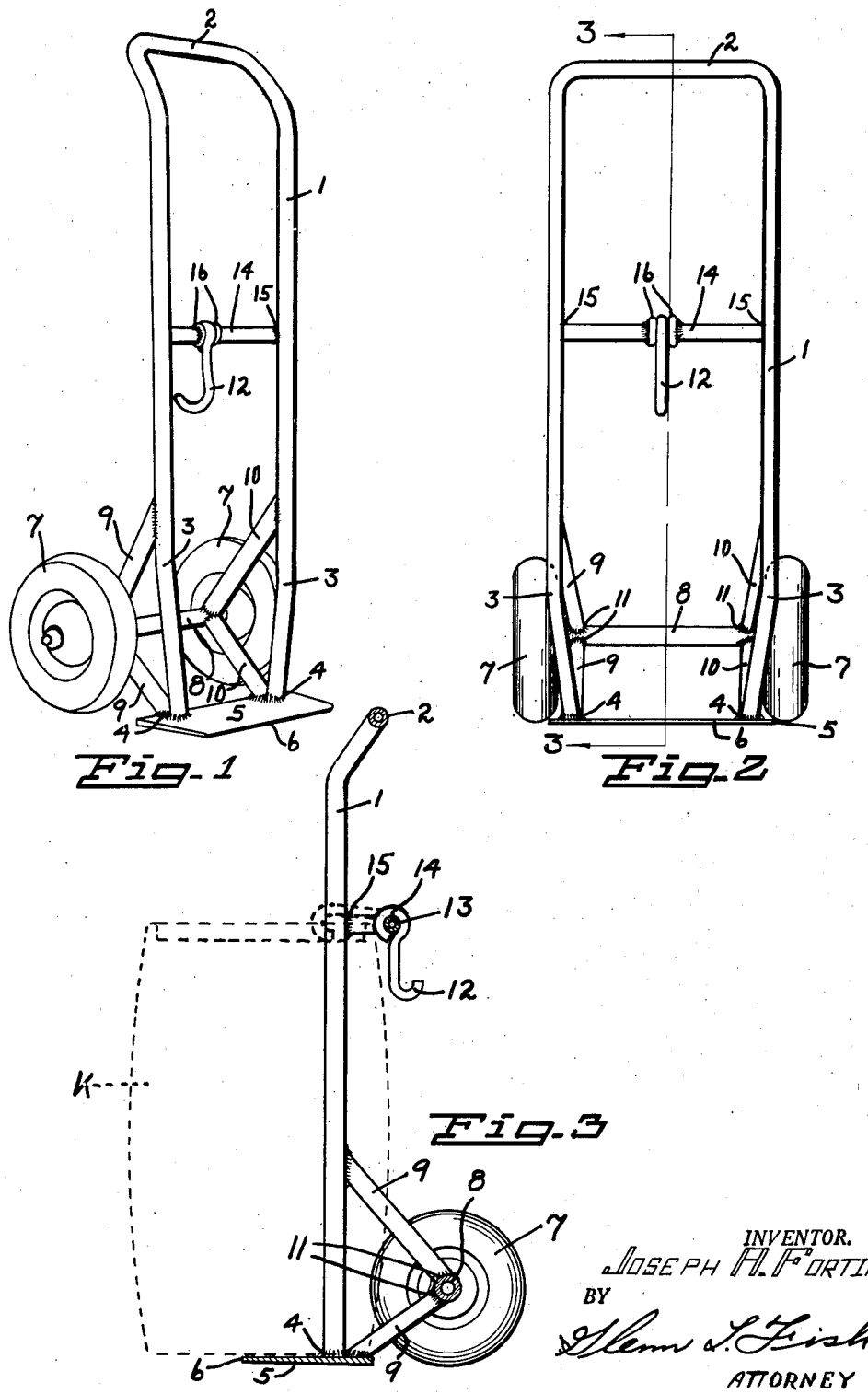

2,476,539

UNITED STATES PATENT OFFICE 2,476,539

HAND TRUCK

Joseph A. Fortin, Lewiston, Idaho

Application December 14, 1946, Serial No. 716,375

1 Claim. (Cl. 214—65.4)

My present invention relates to the general class of land vehicles of the two-wheel type, and more specifically to an improved hand truck of the warehouse type, and while the truck is adapted for use in handling various articles and objects, it is especially designed for manipulating and transporting kegs, barrels, casks, and other similar commodities.

The primary object of the invention is the provision of an implement of this character that includes a minimum number of component parts that may with facility be manufactured at low cost of production, and assembled with convenience to insure a strong, compactly arranged and serviceable implement of comparatively light weight which may be manipulated with facility in loading, transporting, and unloading freight with a minimum expenditure of labor.

The invention consists in certain novel features of construction and combinations and arrangements of parts as will hereinafter be described, and more specifically set forth in the appended claims.

In the accompanying drawings I have illustrated one complete example of a physical embodiment of my invention wherein the component parts are combined and arranged in accord with the best mode I have thus far devised for the practical application of the principles of my invention.

It will, however, be understood that changes and alterations are contemplated and may be made in these exemplifying drawings and mechanical structures, within the scope of my claims without departing from the principles of my invention.

Figure 1 is a perspective view of a hand truck embodying my invention standing in upright position, as for loading and unloading freight.

Figure 2 is a view in front elevation of the implement; and

Figure 3 is a vertical sectional view, as at line 3—3 of Fig. 2, showing by dotted lines a barrel or keg loaded on the truck.

In carrying out my invention I utilize a U-shaped handle-frame 1, of which the connecting bar 2 forms the handle for manipulating the truck, and the frame is preferably fashioned or bent to shape from suitable tubular metal stock.

The lower or front ends of the U-shaped frame are bent inwardly or bowed as at 3 to conform to the shape of a keg or barrel K, shown by dotted lines in Fig. 3, and to reinforce the structure of the frame.

The squared ends of the bowed legs of the handle frame are united by a transversely arranged flat base plate, preferably by welding at 4 the tubular ends of the legs to the plate 5, and the plate forms a substantial base for supporting the truck in upright position ready for use.

The front or forward edge of the base plate is sharpened, as at 6, in order that the plate may be slid under or slipped under the lower head of the upright keg K while in standing position, and the keg may thus conveniently be loaded upon the base plate as a seat for supporting the keg in combination with the bowed legs of the frame, as the truck is being trundled for transportation purposes.

While being trundled the truck is supported upon two wheels 7, 7, preferably of the pneumatic type, and in standing position, the wheels cooperate with the base plate to afford adequate and stabilized support for the upright truck.

The wheels are journaled upon the opposite ends of a tubular axle 8 that is spaced from the handle frame and disposed transversely thereof, and the axle is united to the base plate and to the bowed legs of the handle frame by means of a wheel frame which provides a light, but strong and substantial structure for the truck.

The wheel frame comprises a pair of V-shaped angle braces 9—9 and 10—10, made up of tubular bars, and as indicated in the drawings, the apices of the braces are welded at 11 to the axle, while one bar of each brace is welded to the leg of the handle frame and the other bar welded to the base plate and to the joint between the handle frame and the base plate.

In actual use, after the keg has been manipulated and loaded upon the truck, as indicated in Fig. 3, the upper end or head of the loaded keg is detachably fastened to the handle-frame by means of a retaining hook 12 that engages over the chime of the keg K as indicated by dotted lines in this figure of the drawing.

The hook is swiveled at 13 on a tubular cross bar 14 the ends of which are welded at 15 to the two legs of the handle frame, to brace the frame and aid in supporting the loaded keg. The swiveled hook is mounted at the center of the cross bar, and it is retained against lateral displacement by means of a pair of spaced collars, rings, or washers 16, 16, that are preferably welded in place to confine the hook in operative position.

From this description taken in connection with my drawings it will be apparent that I have provided an effective and substantial hand truck of simple construction which is durable and strong, and which may be manipulated with facility in loading, transporting, and unloading freight of the character described.

Having thus fully described my invention, what I claim as new and desire to secure by Letters Patent is:

The combination in a hand truck with a tubular U-shaped frame having bowed legs, a tubular cross bar welded to the frame, a retaining hook swiveled on the cross bar, and a pair of guiding washers for the hook welded on the bar, of a transversely arranged base plate welded to the ends of the bowed legs, a transversely arranged axle and a pair of wheels journaled on the axle, and a pair of spaced tubular angular braces welded to the axle and to the frame and base plate.

JOSEPH A. FORTIN.

REFERENCES CITED

The following references are of record in the file of this patent:

UNITED STATES PATENTS

| Number | Name | Date |
| --- | --- | --- |
| 224,693 | Johnson | Feb. 17, 1880 |
| 394,443 | Berger | Dec. 11, 1888 |
| 641,286 | Gilfillan | Jan. 16, 1900 |
| 1,125,571 | Lounsbery | Jan. 19, 1915 |
| 1,790,711 | Johnston | Feb. 3, 1931 |
| 2,014,057 | Rogers | Sept. 10, 1935 |
| 2,086,318 | Jackson | July 6, 1937 |
| 2,181,438 | Peet | Nov. 28, 1939 |
| 2,329,439 | Hanssen | Sept. 14, 1943 |

FOREIGN PATENTS

| Number | Country | Date |
| --- | --- | --- |
| 538,817 | Great Britain | Aug. 18, 1941 |